(12) United States Patent
Caldwell et al.

(10) Patent No.: US 12,025,207 B1
(45) Date of Patent: Jul. 2, 2024

(54) NON-CRIMPING CABLE PULLING DEVICE

(71) Applicant: Southwire Company, LLC, Carrollton, GA (US)

(72) Inventors: Thomas J. Caldwell, Jacksonville Beach, FL (US); Andrew Cody Norton, Carrollton, GA (US); Kyle Curry, Dunedin, FL (US)

(73) Assignee: Southwire Company, LLC

( * ) Notice: Subject to any disclaimer, the term of this patent is extended or adjusted under 35 U.S.C. 154(b) by 206 days.

(21) Appl. No.: 17/701,374

(22) Filed: Mar. 22, 2022

Related U.S. Application Data (60) Provisional application No. 63/173,815, filed on Apr. 12, 2021.

(51) Int. Cl.
*F16G 11/02* (2006.01)

(52) U.S. Cl.
CPC .................................. *F16G 11/025* (2013.01)

(58) Field of Classification Search
CPC ...... F16G 11/12; F16G 11/025; F16G 11/048; H02G 1/081
See application file for complete search history.

(56) References Cited

U.S. PATENT DOCUMENTS

| | | | |
|---|---|---|---|
| 3,852,850 A | 12/1974 | Fillhaber | |
| 5,015,023 A | 5/1991 | Hall | |
| 5,369,849 A | 12/1994 | De France | |
| 7,478,794 B1 * | 1/2009 | Gohlke | B66C 1/42 |
| | | | 254/134.3 R |
| 8,398,122 B2 | 3/2013 | Crompton et al. | |
| 8,757,594 B2 * | 6/2014 | Jordan | H02G 1/081 |
| | | | 254/134.3 FT |
| 8,844,981 B1 * | 9/2014 | Crompton | F16L 37/0915 |
| | | | 285/315 |
| 10,027,097 B1 * | 7/2018 | Jordan | G02B 6/4465 |
| 10,461,514 B2 | 10/2019 | Crompton et al. | |
| 11,018,481 B1 | 5/2021 | Crompton et al. | |
| 11,293,519 B1 * | 4/2022 | Jordan | F16G 11/04 |
| 11,428,295 B1 * | 8/2022 | Dias | H02G 1/081 |
| 11,639,745 B2 * | 5/2023 | Dias | F16G 11/14 |
| | | | 24/136 R |
| 2015/0014468 A1 * | 1/2015 | Carlson | B65H 54/00 |
| | | | 242/594 |

FOREIGN PATENT DOCUMENTS

| | | |
|---|---|---|
| KR | 1020040010018 | 1/2004 |
| WO | 2004036711 A1 | 4/2004 |

* cited by examiner

*Primary Examiner* — Robert Sandy
*Assistant Examiner* — Louis A Mercado
(74) *Attorney, Agent, or Firm* — Merchant & Gould P.C.

(57) ABSTRACT

A non-crimping cable pulling device may be provided. The non-crimping cable pulling device may be a cap and a body attached to the cap. The body may be an interior that may have a sleeve section and a jaw assembly section. A sleeve may be disposed in the sleeve section of the body and a jaw assembly may be disposed in the jaw assembly section of the body. The jaw assembly may be a plurality of jaws and a grip ring. The plurality of jaws may each have an exterior side and an interior side. Each of the plurality of jaws may have a spring groove on its exterior side. The grip ring may have a plurality of grip ring legs. Ones of the plurality of grip ring legs may respectively engage the spring groove on each of the plurality of jaws.

31 Claims, 14 Drawing Sheets

NON-CRIMPING CABLE PULLING DEVICE

RELATED APPLICATION

Under provisions of 35 U.S.C. § 119(e), Applicant claims the benefit of U.S. Provisional Application No. 63/173,815 filed Apr. 12, 2021, which is incorporated herein by reference.

BACKGROUND

Electrical wiring is an electrical installation of cabling and associated devices such as switches, distribution boards, sockets, and light fittings in a structure. Electrical conduit provides very good protection to enclosed conductors from impact, moisture, and chemical vapors. Varying numbers, sizes, and types of conductors can be pulled into a conduit, which simplifies design and construction compared to multiple runs of cables or the expense of customized composite cable. Wiring systems in buildings may be subject to frequent alterations. Frequent wiring changes are made simpler and safer through the use of electrical conduit, as existing conductors can be withdrawn and new conductors installed, with little disruption along the path of the conduit.

A conduit system can be made waterproof or submersible. Metal conduit can be used to shield sensitive circuits from electromagnetic interference, and also can prevent emission of such interference from enclosed power cables. Non-metallic conduits resist corrosion and are light-weight, reducing installation labor cost.

When installed with proper sealing fittings, a conduit will not permit the flow of flammable gases and vapors, which provides protection from fire and explosion hazard in areas handling volatile substances.

Some types of conduit are approved for direct encasement in concrete. This is commonly used in commercial buildings to allow electrical and communication outlets to be installed in the middle of large open areas. For example, retail display cases and open-office areas use floor-mounted conduit boxes to connect power and communications cables.

Both metal and plastic conduit can be bent at the job site to allow a neat installation without excessive numbers of manufactured fittings. This is particularly advantageous when following irregular or curved building profiles. Special tube bending equipment is used to bend the conduit without kinking or denting it.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

A non-crimping cable pulling device may be provided. The non-crimping cable pulling device may comprise a cap and a body attached to the cap. The body may comprise an interior that may have a sleeve section and a jaw assembly section. A sleeve may be disposed in the sleeve section of the body and a jaw assembly may be disposed in the jaw assembly section of the body. The jaw assembly may comprise a plurality of jaws and a grip ring. The plurality of jaws may each have an exterior side and an interior side. Each of the plurality of jaws may have a spring groove on its exterior side. The grip ring may have a plurality of grip ring legs. Ones of the plurality of grip ring legs may respectively engage the spring groove on each of the plurality of jaws.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Figure 1:
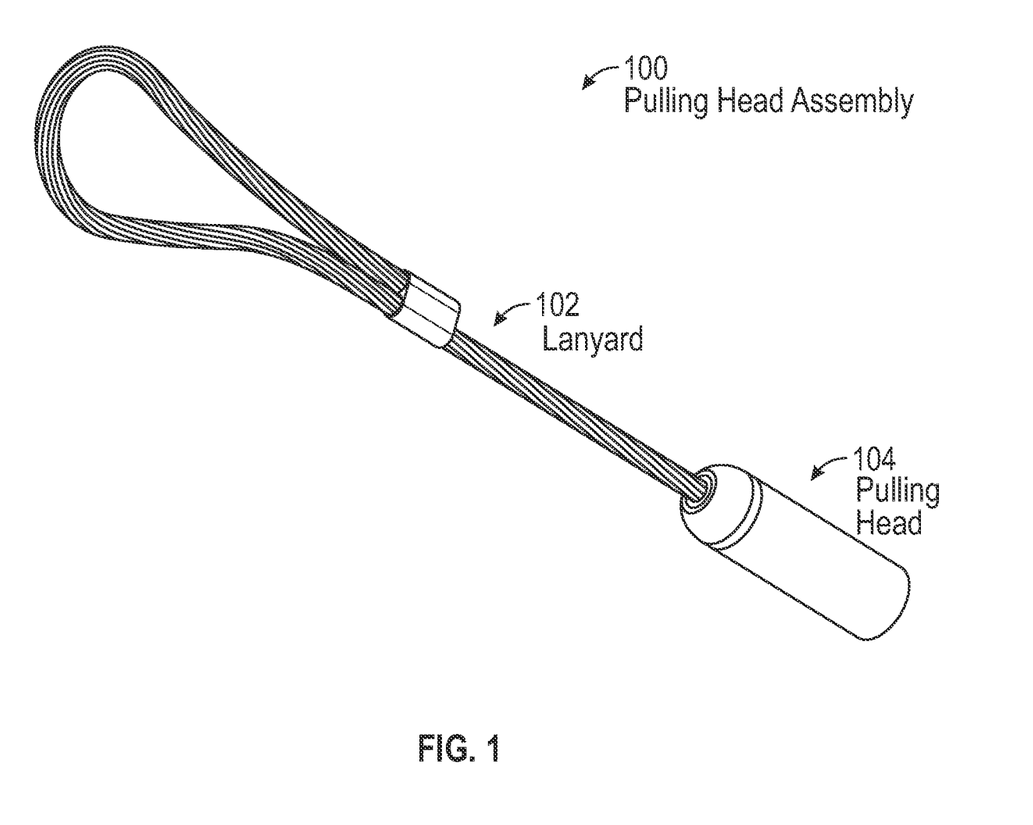
FIG. 1 illustrates a pulling head assembly.

FIG. 1 illustrates a pulling head assembly 100 consistent with embodiments of the disclosure. As shown in FIG. 1, pulling head assembly 100 may comprise a lanyard 102 and a pulling head 104. Consistent with embodiments of the disclosure, a cable may be inserted into an anterior end (i.e., end opposite lanyard 102) of pulling head assembly 100 that may retain the cable. Once the cable is inserted into the anterior end of pulling head assembly 100, it may be very difficult to pull the cable back out of the anterior end of pulling head assembly 100.

Figure 2:
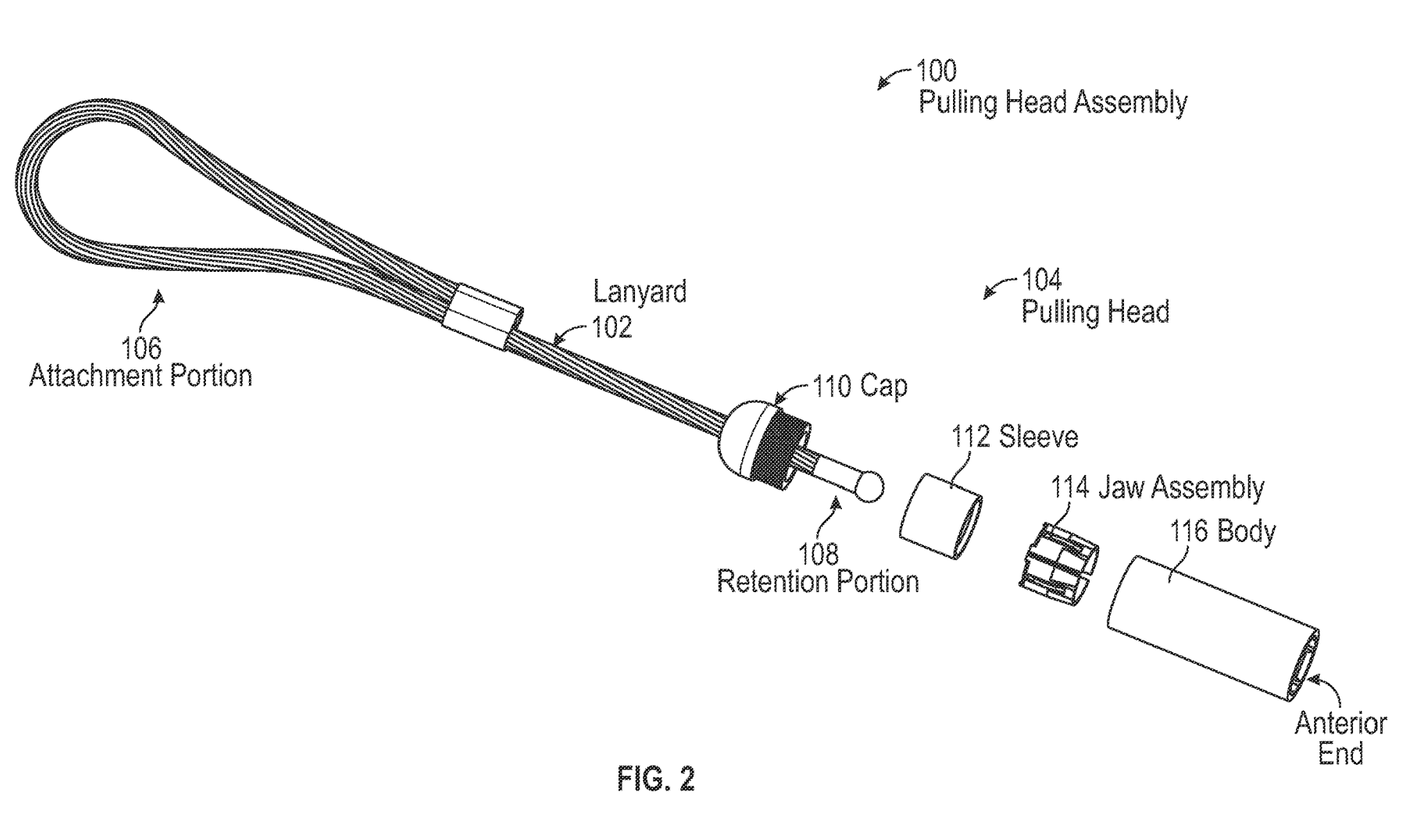
FIG. 2 illustrates the pulling head assembly of FIG. 1 in more detail.

FIG. 2 illustrates the pulling head assembly 100 of FIG. 1 in more detail. As shown in FIG. 2, pulling head assembly 100 may comprise a lanyard 102 and a pulling head 104. Lanyard 102 may comprise an attachment portion 106 and a retention portion 108. Pulling head 104 may comprise a cap 110, a sleeve 112, a jaw assembly 114, and a body 116. As will be described in greater detail below, sleeve 112 and jaw assembly 114 may be inserted into body 116. Once jaw assembly 114 and sleeve 112 are inserted into body 116, cap 110 may be attached to body 116 thus causing sleeve 112 and jaw assembly 114 to be retained in body 116. A washer may be placed between cap 110 and sleeve 112.

Once a cable is inserted into the anterior end of pulling head assembly 100, the cable may be considered attached to pulling head assembly 100 because jaw assembly 114 by resist the cable from being pulled back out of the anterior end. The cable may be pushed into the anterior end, through jaw assembly 114, and a portion of the cable may extend into sleeve 112. Cap 110 may retain retention portion 108. Then the cable may be pulled, for example through a conduit, by pulling attachment portion 106 of lanyard 102 through the conduit. Consistent with embodiments of the disclosure, the cable may not separate from pulling head assembly 100 while being pulled under normal cable pulling conditions for example.

Figure 3A:
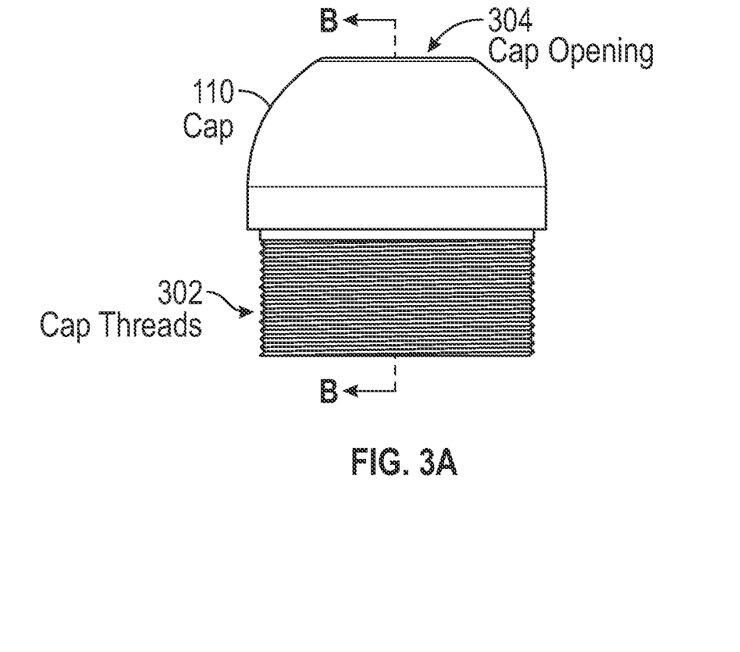
FIGS. 3A, 3B, and 3C illustrate a cap that may be used in conjunction with the pulling head assembly of FIG. 1.
Figure 3B:
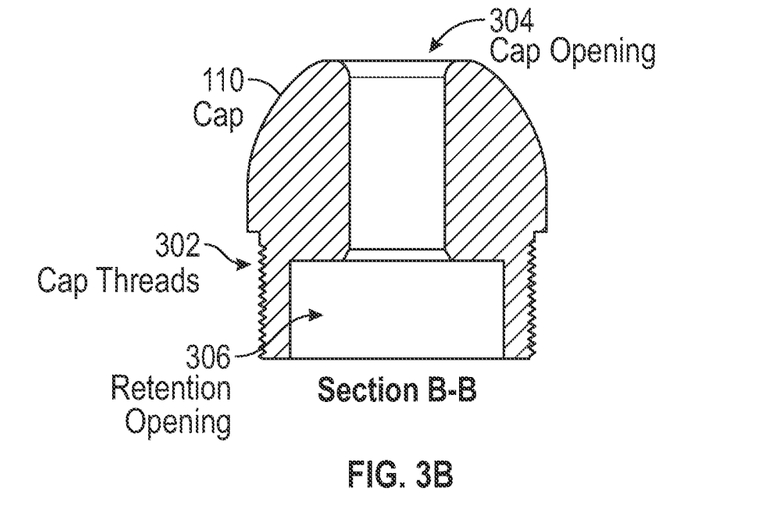
Figure 3C:
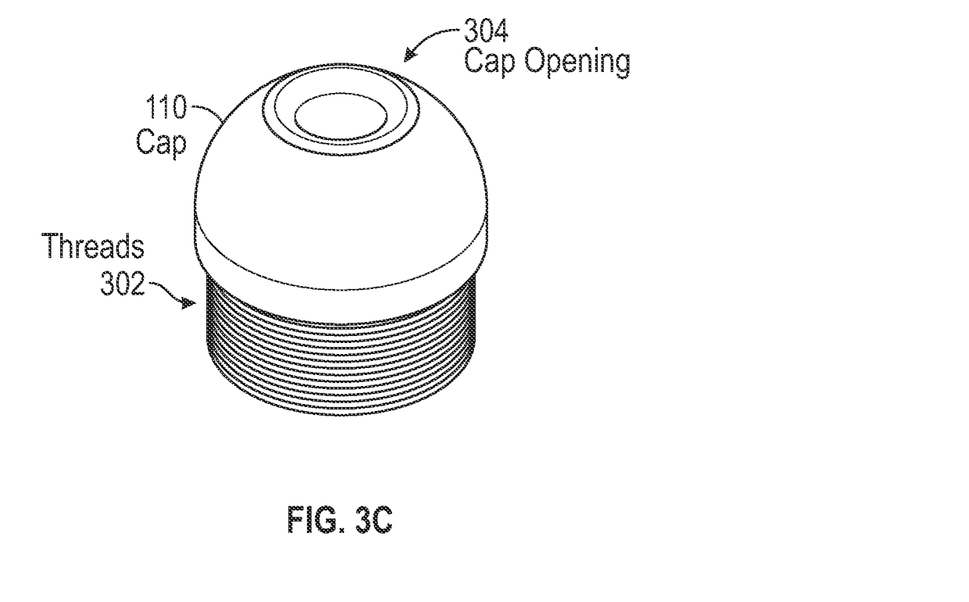

FIGS. 3A, 3B, and 3C illustrate cap 110 that may be used in conjunction pulling head assembly 100 of FIG. 1 and FIG. 2. As shown in FIGS. 3A, 3B, and 3C, cap 110 may comprise cap threads 302, a cap opening 304, and a retention opening 306. Cap threads 302 may mate with threads in body 116, for example, to attached cap 110 to body 116. While FIGS. 3A, 3B, and 3C show cap threads 302 as male threads, embodiments of the disclosure are not so limited, and cap threads 302 may comprise female threads for example. Retention opening 306 may be large enough to contain an element at an end of retention portion 108 of lanyard 102, but this element may be too large to pass through cap opening 304. Accordingly, cap 110 may retain retention portion 108 of lanyard 102 when attachment portion is pulled.

Figure 4A:
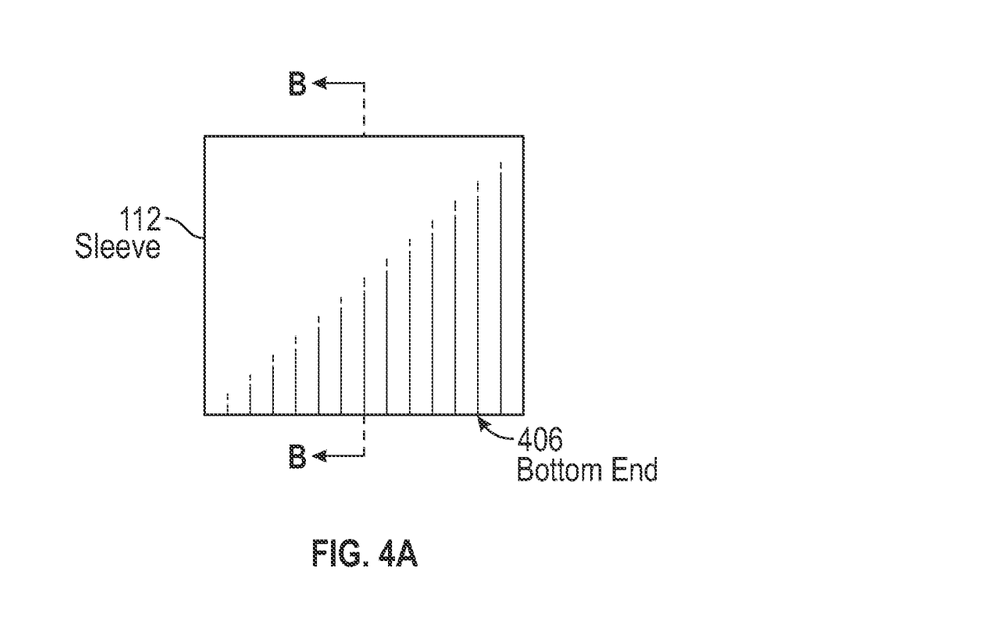
FIGS. 4A, 4B, and 4C illustrate a sleeve that may be used in conjunction with the pulling head assembly of FIG. 1.
Figure 4B:
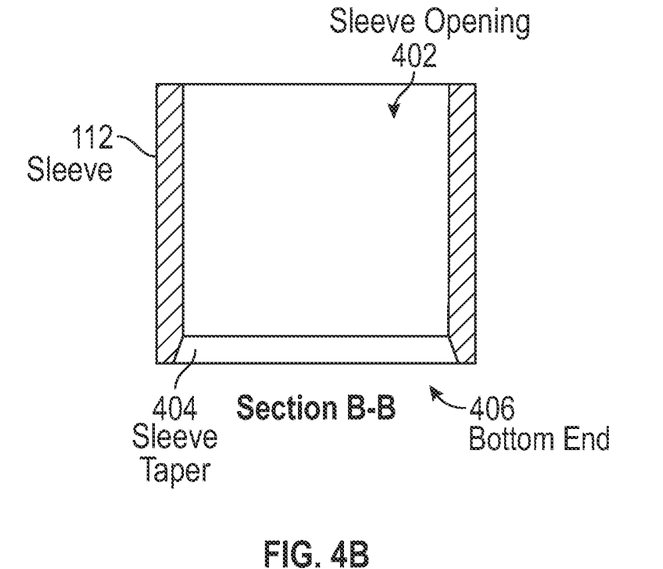
Figure 4C:
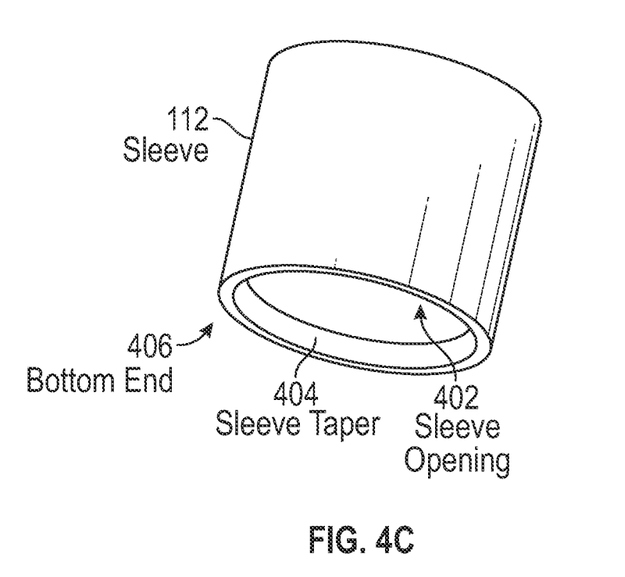

FIGS. 4A, 4B, and 4C illustrate sleeve 112 that may be used in conjunction pulling head assembly 100 of FIG. 1 and FIG. 2. As shown in FIG. 1 and FIG. 2, sleeve 112 may comprise a sleeve opening 402, a sleeve taper 404, and a bottom end 406. In operation, as described above, a portion of the cable inserted into the anterior end of body 116 may occupy a portion of the length of sleeve opening 402. Sleeve taper 404 may allow sleeve 112 to mate with jaw assembly 114.

Figure 5A:
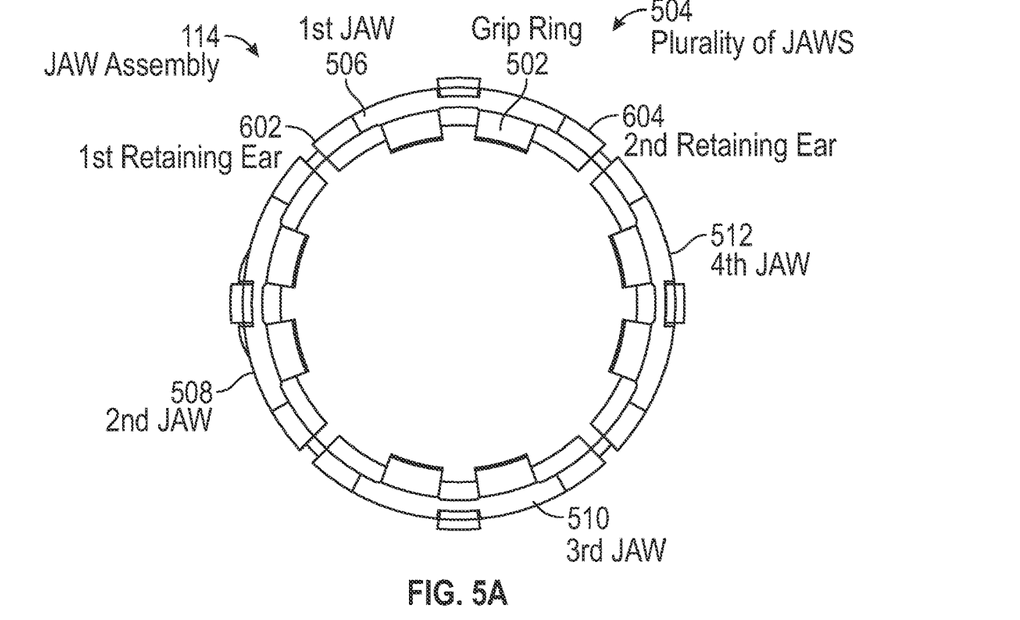
FIGS. 5A, 5B, and 5C illustrate a jaw assembly that may be used in conjunction with the pulling head assembly of FIG. 1.
Figure 5B:
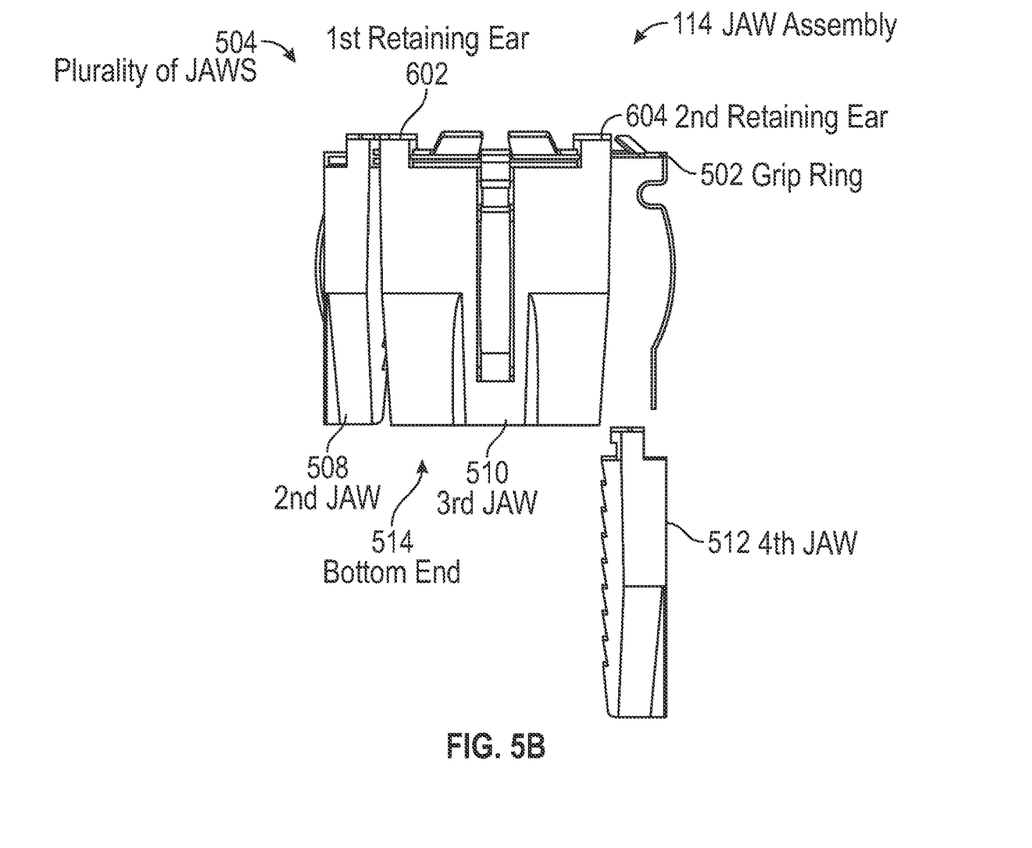
Figure 5C:
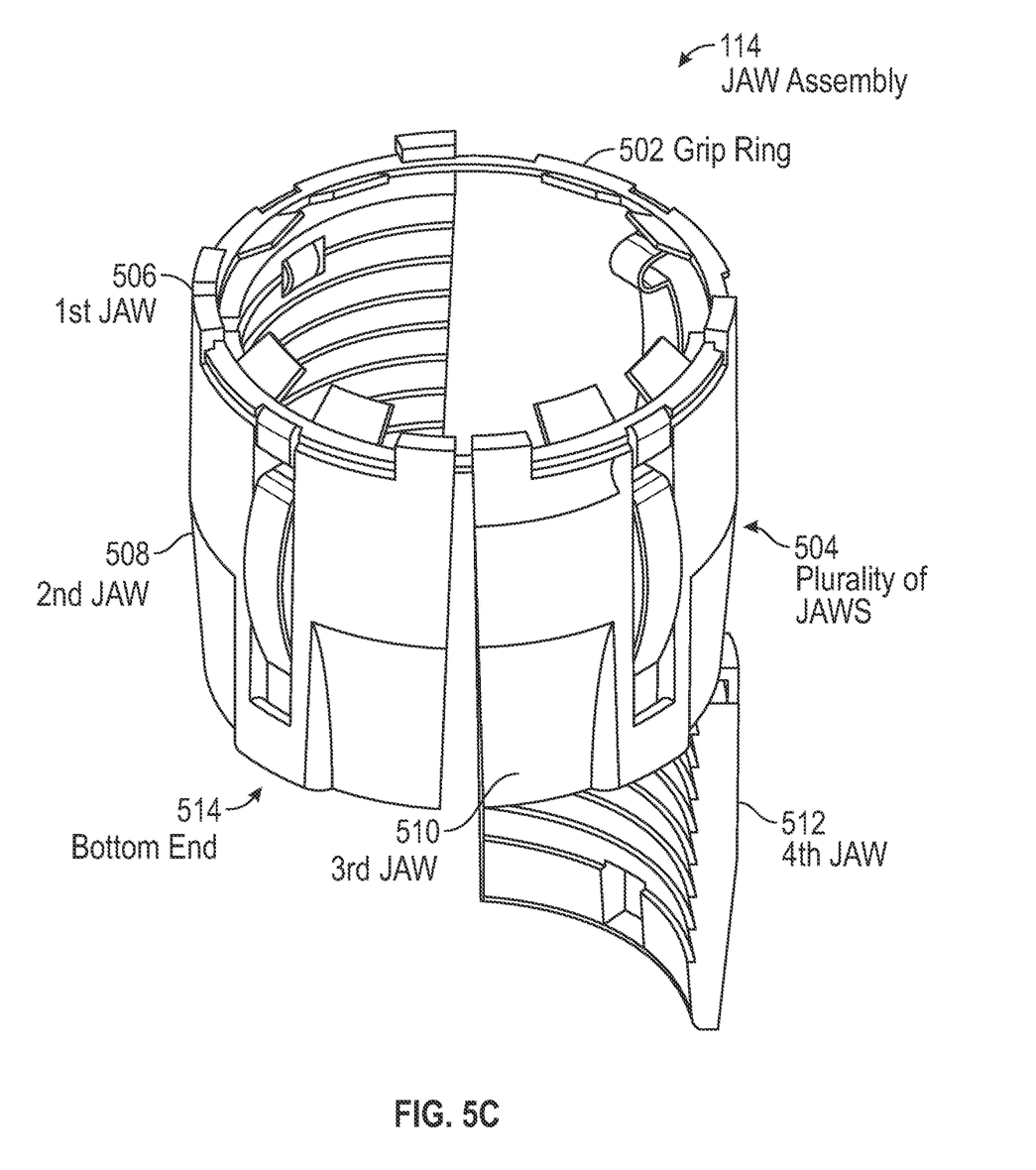

FIGS. 5A, 5B, and 5C illustrate jaw assembly 114 that may be used in conjunction pulling head assembly 100 of FIG. 1 and FIG. 2. As shown in FIGS. 5A, 5B, and 5C, jaw assembly 114 may comprise a grip ring 502 a plurality of jaws 504. As will be described in more detail below, grip ring 502 may retain plurality of jaws 504. Plurality of jaws 504 may comprise a first jaw 506, a second jaw 508, a third jaw 510, and a fourth jaw 512. While four jaws are illustrated, any number of jaws may be used and embodiments of the disclosure are not limited to four jaws. FIG. 5B and FIG. 5C show fourth jaw 512 in a downward position, but fourth jaw 512 may be moved upward and retained by grip ring 502. Jaw assembly 114 may comprise a bottom end 514.

Figure 6A:
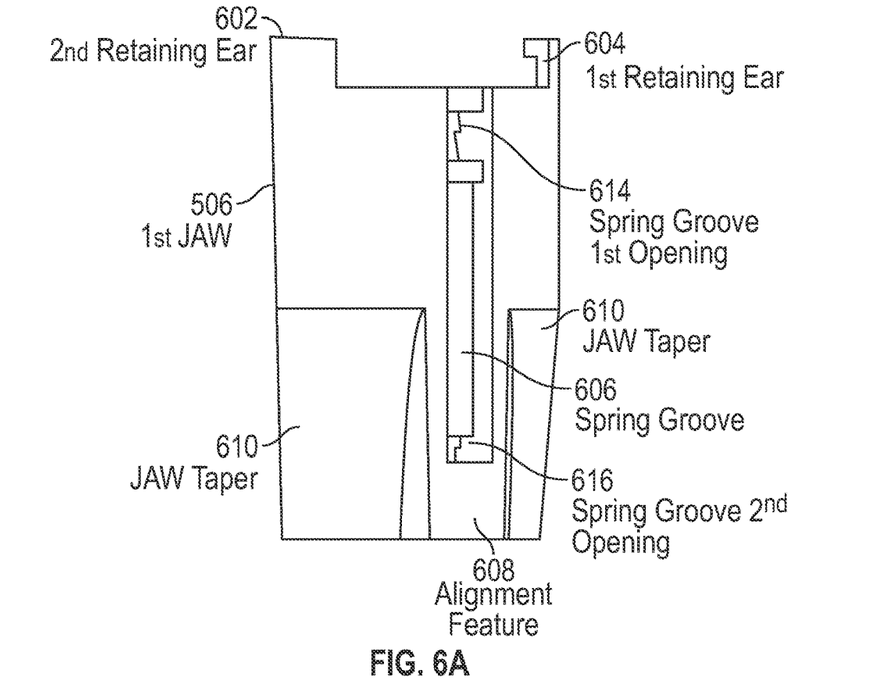
FIGS. 6A, 6B, 6C, and 6D illustrate a jaw that may be used in conjunction with the jaw assembly of FIGS. 5A, 5B, and 5C.
Figure 6B:
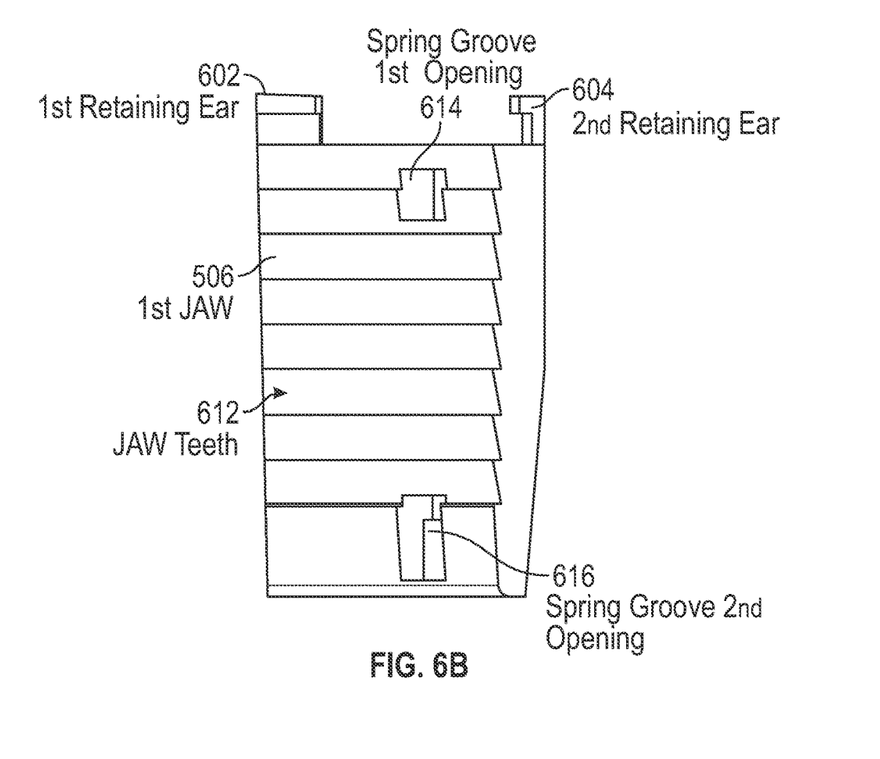
Figure 6C:
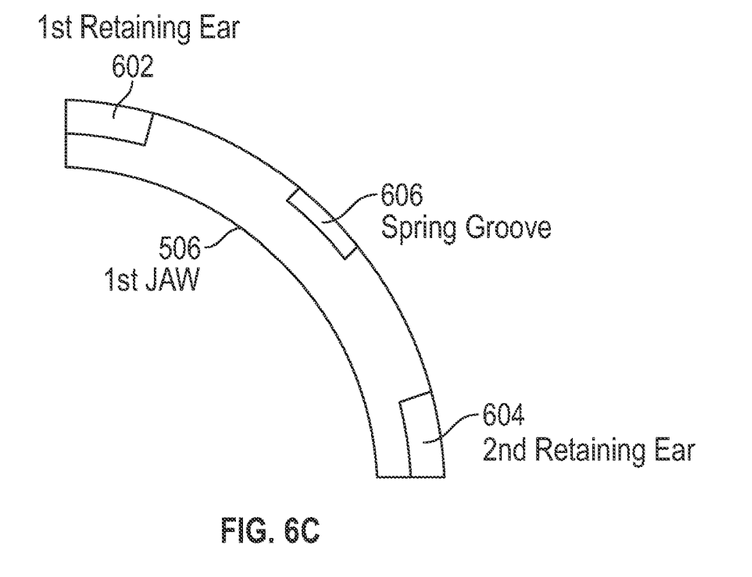
Figure 6D:
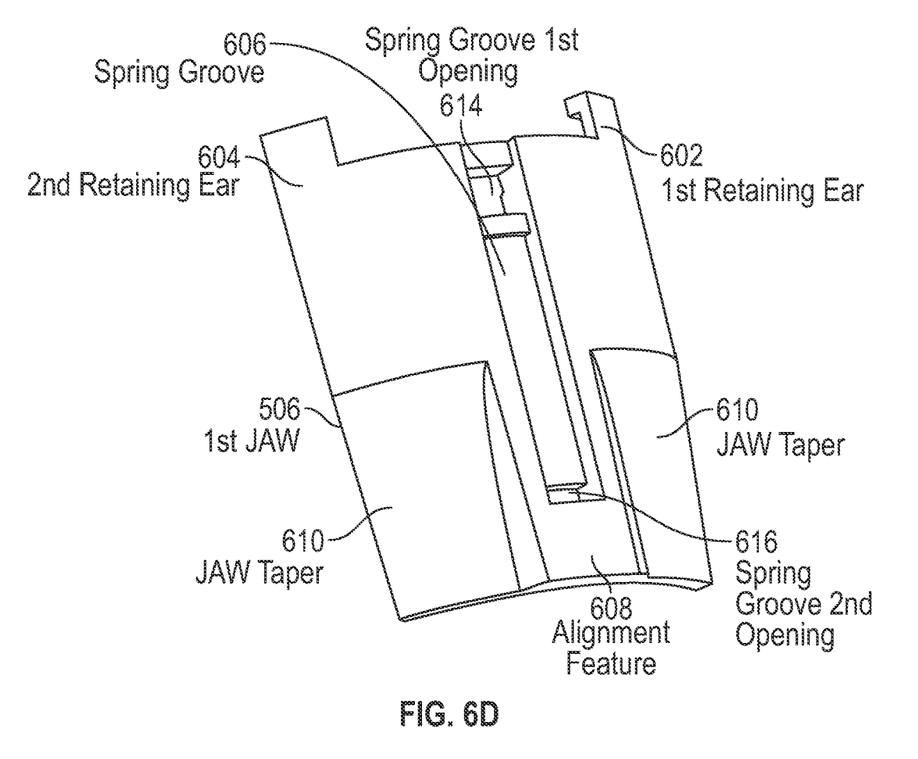

FIGS. 6A, 6B, 6C, and 6D illustrate first jaw 506 that may be used in conjunction with jaw assembly 114 of FIGS. 5A, 5B, and 5C. FIGS. 6A and 6D show an exterior side of first jaw 506 that may be adjacent an interior of body 116 when jaw assembly 114 is inserted into body 116. FIG. 6B shows an interior side of first jaw 506 that may be adjacent a cable during operation of pulling head assembly. FIG. 6C shows a top side of first jaw 506 that may be adjacent grip ring 502. While first jaw 506 may be described in FIGS. 6A, 6B, 6C, and 6D, second jaw 508, third jaw 510, and fourth jaw 512 may be of similar structure and construction. As shown in FIGS. 6A, 6B, 6C, and 6D, first jaw 506 may comprise a first retaining ear 602, a second retaining ear 604, a spring groove 606, an alignment feature 608, a jaw taper 610, jaw teeth 612, spring groove first opening 614, and spring groove second opening 616. As will be described in greater detail below, jaw teeth 612 be adjacent a cable during operation of pulling head assembly 100. Jaw teeth 612 may be oriented is such a way that they provide little resistance to a cable being inserted into pulling head assembly 100, but provide greater resistance when a force acts upon the inserted cable in a direction opposite the direction in which the cable was inserted.

Figure 7A:
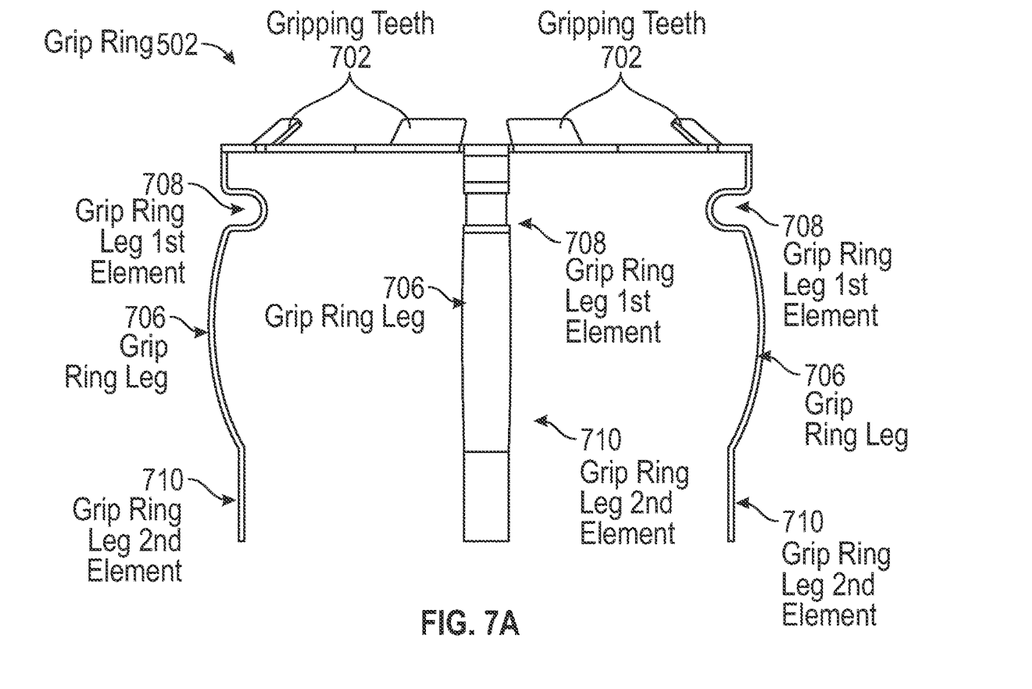
FIGS. 7A, 7B, and 7C illustrate a grip ring that may be used in conjunction with the jaw assembly of FIGS. 5A, 5B, and 5C.
Figure 7B:
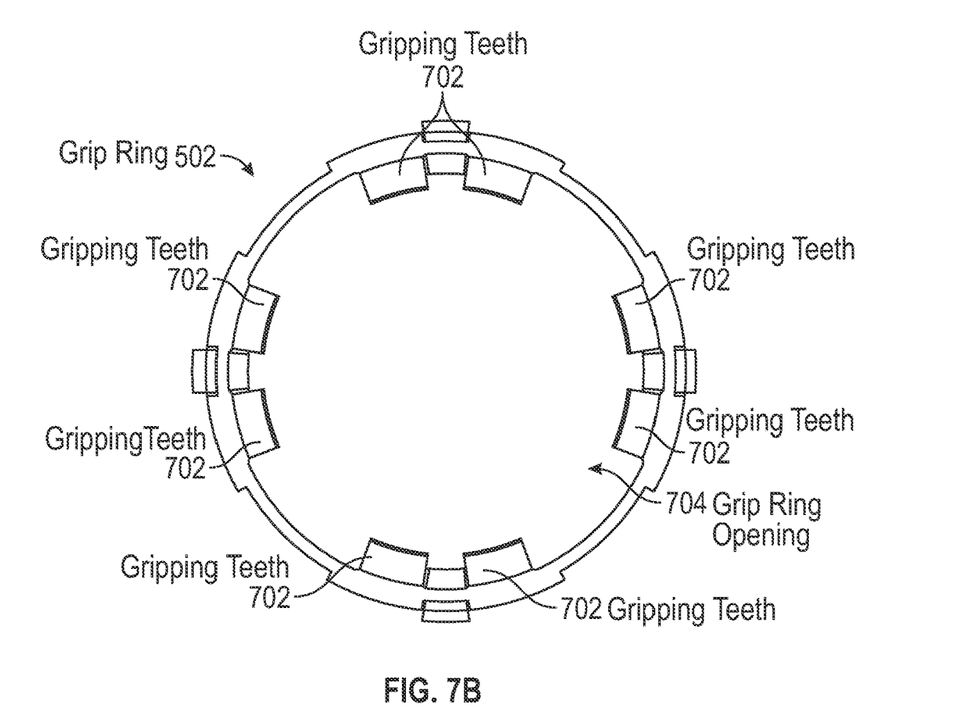
Figure 7C:
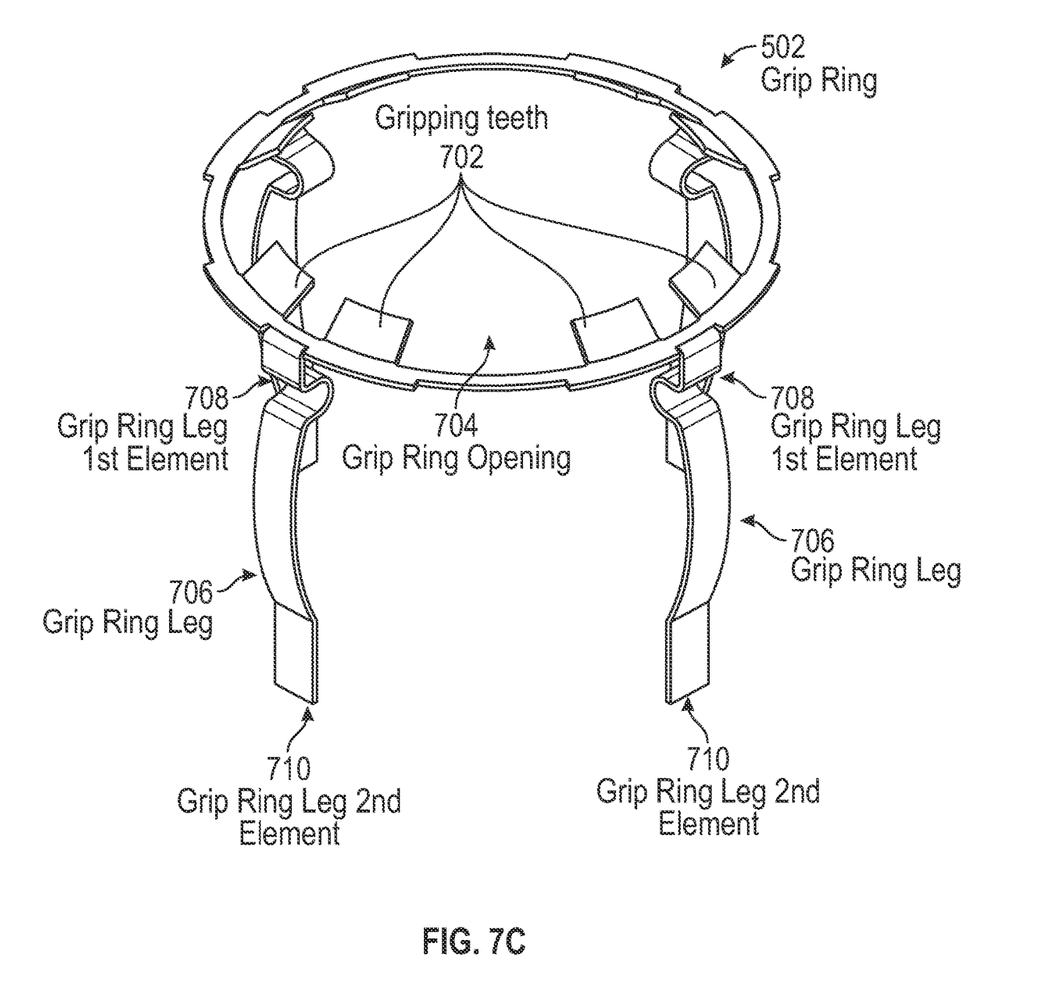

FIGS. 7A, 7B, and 7C illustrate grip ring 502 that may be used in conjunction with jaw assembly 114 of FIGS. 5A, 5B, and 5C. As shown in FIGS. 7A, 7B, and 7C, grip ring 502 may comprise a plurality of gripping teeth 702 that may extent into a grip ring opening 704. In addition, grip ring 502 may comprise a plurality of grip ring legs 706 that may extend down from grip ring 502. Each grip ring leg 706 may comprise a grip ring leg first element 708 and a grip ring leg second element 710.

To provide jaw assembly 114, grip ring 502 may retain plurality of jaws 504. For example, each of the retaining ears (e.g., first retaining ear 602 and second retaining ear 604) may snap onto and retain grip ring 502. Furthermore, each grip ring leg 706 may engage spring groove 606 to help retain a respective corresponding jaw (e.g., first jaw 506, second jaw 508, third jaw 510, or fourth jaw 512). Furthermore, grip ring leg first element 708 may engage spring groove first opening 614 and grip ring leg second element 710 may engage spring groove second opening 616 to help retain the respective corresponding jaw. In this way, the grip ring legs 706 and the retaining ears (e.g., first retaining ear 602 and second retaining ear 604) may work to retain the plurality of jaws by grip ring 502 in order to provide jaw assembly 114 consistent with embodiments of the disclosure. Furthermore, gripping teeth 702 may be oriented is such a way that they provide little resistance to a cable being inserted into pulling head assembly 100, but provide greater resistance when a force acts upon the inserted cable in a direction opposite the direction in which the cable was inserted.

Figure 8A:
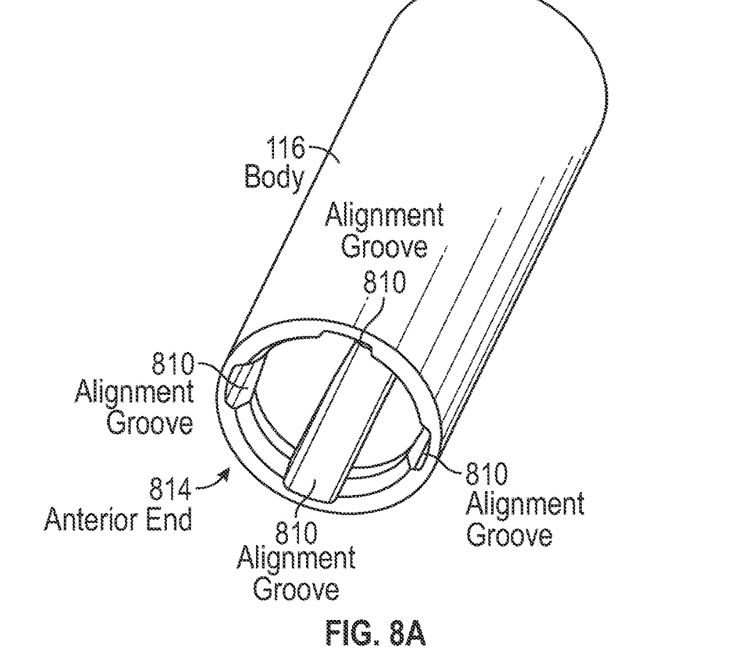
FIGS. 8A and 8B illustrate a body that may be used in conjunction the pulling head assembly of FIG. 1.
Figure 8B:
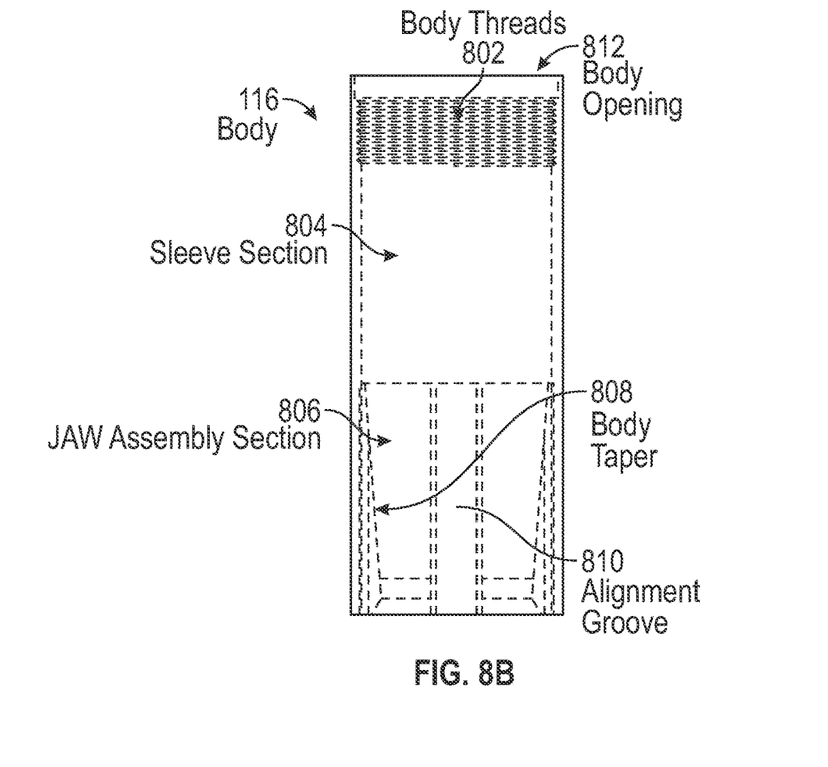

FIGS. 8A and 8B illustrate body 116 that may be used in conjunction pulling head assembly 100 of FIG. 1 and FIG. 2. As shown in FIGS. 8A and 8B, body 116 may comprise body threads 802, a sleeve section 804, and a jaw assembly section 806. While FIG. 8B shows body threads 802 as female threads, embodiments of the disclosure are not so limited, and body threads 802 may comprise male threads for example. Jaw assembly section 806 may comprise body tapers 808 and alignment grooves 810. When pulling head assembly 100 is assembled, jaw assembly 114 may slide down into body opening 812 until it occupies jaw assembly section 806. Bottom end 514 of jaw assembly 114 may be inserted first. When jaw assembly 114 occupies jaw assembly section 806, alignment features 608 of plurality of jaws 504 may align and engage with alignment groves 810 of body 116, which may keep jaw assembly 114 from rotating in jaw assembly section 806 of body 116. Similarly, when jaw assembly 114 occupies jaw assembly section 806, jaw tapers 610 of plurality of jaws 504 may align and engage with alignment body tapers 808 of body 116, which may keep jaw assembly 114 from sliding all the way through body 116 and may retain it in jaw assembly section 806 of body 116.

After jaw assembly 114 slides down into body opening 812 until it occupies jaw assembly section 806, sleeve 112 may slide down into body opening 812 until it occupies sleeve section 804. Bottom end 406 of sleeve 112 may be inserted first. Sleeve taper 404 may be adjacent jaw assembly 114. Then cap 110 may be attached to body 116 by engaging body threads 802 of body 116 with cap threads 302 of cap 110. In this way, sleeve 112 and jaw assembly 114 may be retained snuggly inside body 116 and pulling head assembly 100 may be ready to be used to pull cable.

In order to use pulling head assembly 100 to pull cable, a portion of a cable, for example, may be stripped of its insulation and the stripped portion of the cable may be inserted into an anterior end 814 of body 116. The cable may be considered attached to pulling head assembly 100 because jaw assembly 114 may resist the cable from being pulled back out of anterior end 814. The cable may be pushed into anterior end 814, through jaw assembly 114, and a portion of the cable may extend into sleeve 112. Cap 110 may retain retention portion 108. Then the cable may be pulled, for example through a conduit, by pulling lanyard 102 through a conduit by attachment portion 106. Consistent with embodiments of the disclosure, the cable may not separate from the pulling head assembly 100 while the pulling head assembly 100 is pulled under normal cable pulling conditions. The cable may not separate from the pulling head assembly 100 while being pulled under normal cable pulling conditions because jaw assembly 114 may resist the cable from being pulled back out anterior end 814. Jaw assembly 114 may resist the cable from being pulled back out anterior end 814 because gripping teeth 702 of grip ring 502 and jaw teeth 612 of the plurality of jaws 504 may bite into the cable and hold the cable in jaw assembly 114. While the orientation of gripping teeth 702 of grip ring 502 and jaw teeth 612 of the plurality of jaws 504 may provide little resistance to the cable being pushed into anterior end 814, these same elements may resist the cable from being pulled back out anterior end 814 as described above.

Figure 9:
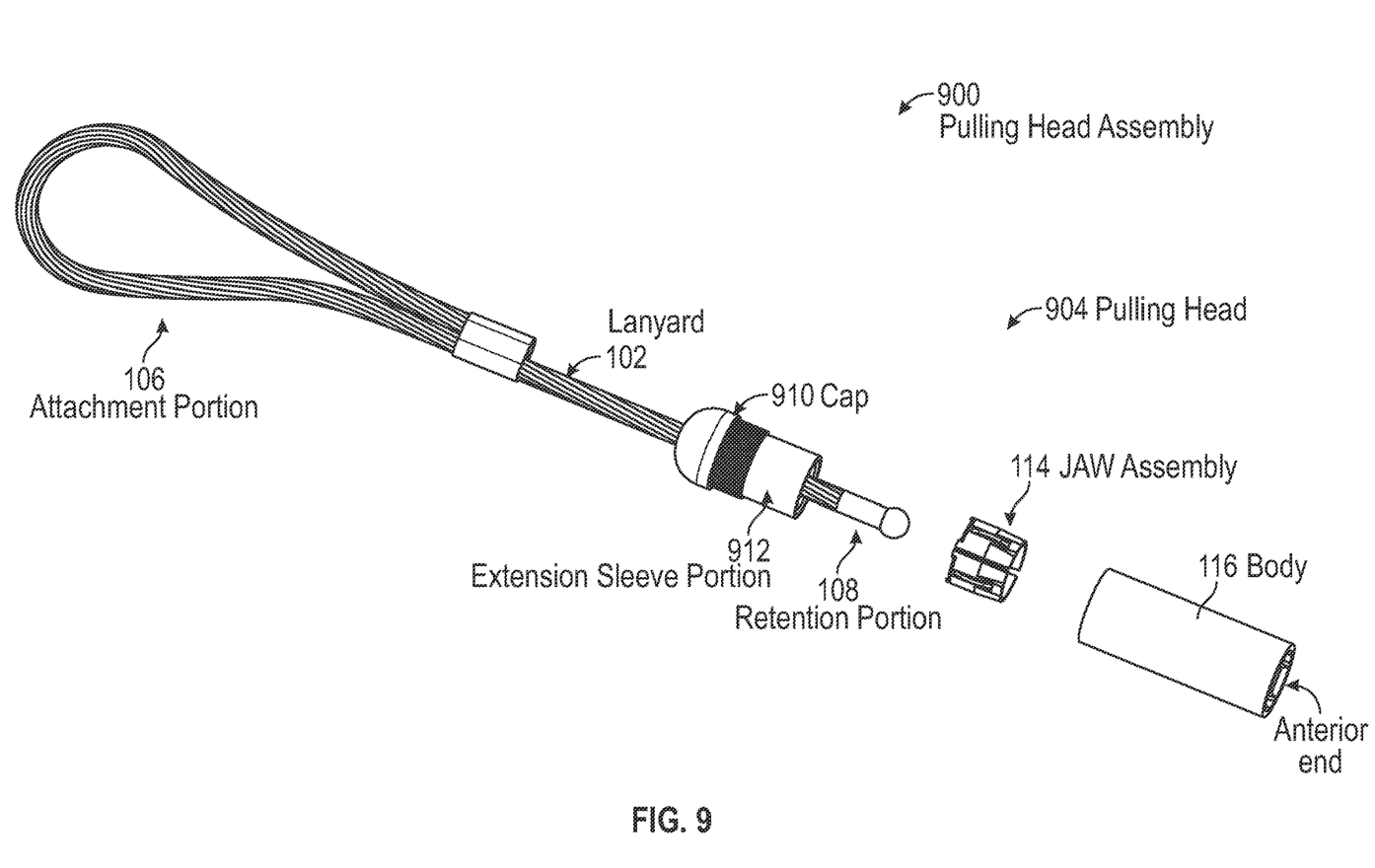
FIG. 9 illustrates a pulling head assembly.

FIG. 9 illustrates a pulling head assembly 900. As shown in FIG. 9, pulling head assembly 900 may comprise lanyard 102 and a pulling head 904. Lanyard 102 may comprise an attachment portion 106 and a retention portion 108. Pulling head 904 may comprise a cap 910. Cap may comprise an extension sleeve portion 912. Pulling head 904 may further comprise jaw assembly 114 and a body 116. As will be described in greater detail below, extension sleeve portion 912 of cap 910 and jaw assembly 114 may be inserted into body 116. Once jaw assembly 114 and extension sleeve portion 912 of cap 910 are inserted into body 116, cap 910 may be attached to body 116 thus causing extension sleeve portion 912 of cap 910 and jaw assembly 114 to be retained in body 116.

Once a cable is inserted into the anterior end of pulling head assembly 900, the cable may be considered attached to pulling head assembly 900 because jaw assembly 114 by resist the cable from being pulled back out of the anterior end. The cable may be pushed into the anterior end, through jaw assembly 114, and a portion of the cable may extend into extension sleeve portion 912 of cap 910. Cap 910 may retain retention portion 108. Then the cable may be pulled, for example, through a conduit by pulling attachment portion 106 of lanyard 102 through the conduit. Consistent with embodiments of the disclosure, the cable may not separate from pulling head assembly 900 while being pulled under normal cable pulling conditions for example.

Figure 10A:
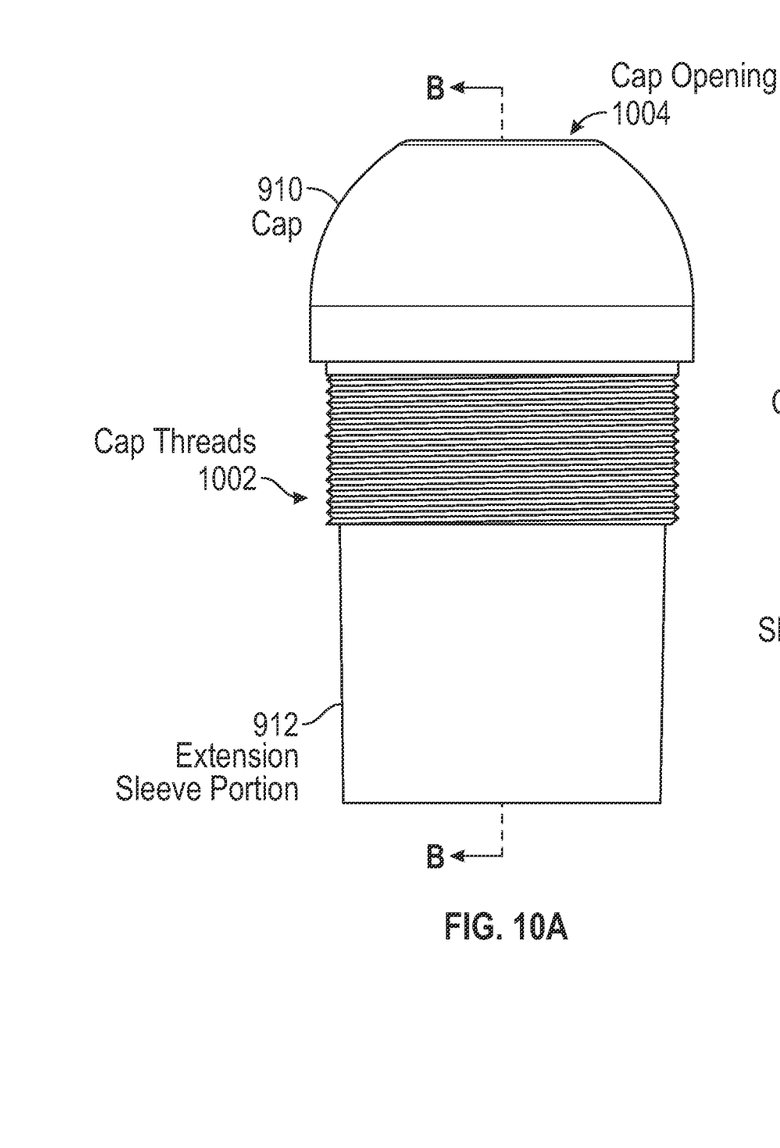
FIGS. 10A and 10B illustrate a cap that may be used in conjunction with the pulling head assembly of FIG. 9.
Figure 10B:
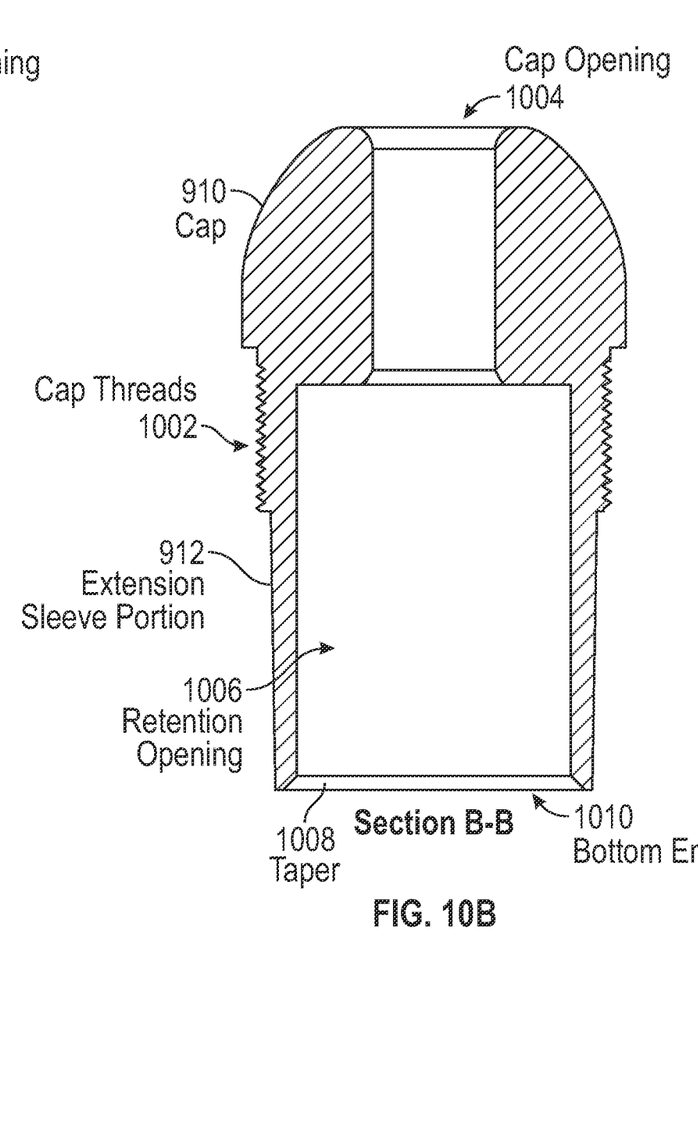

FIGS. 10A and 10B illustrate cap 910 that may be used in conjunction pulling head assembly 900 of FIG. 9. As shown in FIGS. 3A and 3B, cap 910 may comprise cap threads 1002, a cap opening 1004, and a retention opening 1006. Cap threads 1002 may mate with threads in body 116, for example, to attached cap 910 to body 116. While FIGS. 10A and 10B show cap threads 1002 as male threads, embodiments of the disclosure are not so limited, and cap threads 1002 may comprise female threads for example. Retention opening 1006 may be large enough to contain an element at an end of retention portion 108 of lanyard 102, but this element may be too large to pass through cap opening 1004. Accordingly, cap 910 may retain retention portion 108 of lanyard 102 when attachment portion is pulled.

Extension sleeve portion 912 of cap 910 may comprise a taper 1008 and a bottom end 1010. In operation, as described above, a portion of the cable inserted into the anterior end of body 116 may occupy a portion of the length of retention opening 1006. Taper 1008 may allow extension sleeve portion 912 of cap 910 to mate with jaw assembly 114.

With respect to FIGS. 8A and 8B, after jaw assembly 114 slides down into body opening 812 until it occupies jaw assembly section 806, extension sleeve portion 912 of cap 910 may slide down into body opening 812 until it occupies sleeve section 804. Bottom end 1010 of extension sleeve portion 912 of cap 910 may be inserted first. Taper 1008 may be adjacent jaw assembly 114. Cap 910 may be attached to body 116 by engaging body threads 802 of body 116 with cap threads 1002 of cap 910. In this way, extension sleeve portion 912 of cap 910 and jaw assembly 114 may be retained snuggly inside body 116 and pulling head assembly 900 may be ready to be used to pull cable.

In order to use pulling head assembly 900 to pull cable, a portion of a cable, for example, may be stripped of its insulation and the stripped portion of the cable may be inserted into an anterior end 814 of body 116. The cable may be considered attached to pulling head assembly 900 because jaw assembly 114 may resist the cable from being pulled back out of anterior end 814. The cable may be pushed into anterior end 814, through jaw assembly 114, and a portion of the cable may extend into extension sleeve portion 912 of cap 910. Cap 910 may retain retention portion 108. Then the cable may be pulled, for example through a conduit, by pulling lanyard 102 through a conduit by attachment portion 106.

Consistent with embodiments of the disclosure, the cable may not separate from pulling head assembly 900 while the pulling head assembly 900 is pulled under normal cable pulling conditions. The cable may not separate from the pulling head assembly 900 while being pulled under normal cable pulling conditions because jaw assembly 114 may resist the cable from being pulled back out anterior end 814. Jaw assembly 114 may resist the cable from being pulled back out anterior end 814 because gripping teeth 702 of grip ring 502 and jaw teeth 612 of the plurality of jaws 504 may bite into the cable and hold the cable in jaw assembly 114. While the orientation of gripping teeth 702 of grip ring 502 and jaw teeth 612 of the plurality of jaws 504 may provide little resistance to the cable being pushed into anterior end 814, these same elements may resist the cable from being pulled back out anterior end 814 as described above.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. An apparatus comprising:
   a cap;
   a body attached to the cap, the body comprising an interior having, a sleeve section, and
a jaw assembly section;
a sleeve disposed in the sleeve section of the body; and
a jaw assembly disposed in the jaw assembly section of the body, the jaw assembly comprising;
a plurality of jaws each having an exterior side and an interior side wherein each of the plurality of jaws has a spring groove on the exterior side, and
a grip ring having a plurality of grip ring legs wherein ones of the plurality of grip ring legs respectively engage the spring groove on each of the plurality of jaws.

2. The apparatus of claim 1, wherein the grip ring comprises a grip ring opening wherein a plurality of gripping teeth extend from the grip ring into the grip ring opening.

3. The apparatus of claim 1, wherein a one of the plurality of jaws comprises an alignment feature on the exterior side that engages an alignment groove in the jaw assembly section of the body.

4. The apparatus of claim 1, wherein a one of the plurality of jaws comprises a jaw taper on the exterior side that engages a body taper in the jaw assembly section of the body.

5. The apparatus of claim 1, wherein a one of the plurality of jaws comprises a retaining ear that retains the grip ring.

6. The apparatus of claim 1, wherein a one of the plurality of grip ring legs comprises a grip ring leg first element that engages a spring groove first opening on the spring groove that the one of the plurality of grip ring legs engages.

7. The apparatus of claim 1, wherein a one of the plurality of grip ring legs comprises a grip ring leg second element that engages a spring groove second opening on the spring groove that the one of the plurality of grip ring legs engages.

8. The apparatus of claim 1, wherein each of the plurality of jaws comprise jaw teeth on their respective interior side.

9. The apparatus of claim 1, further comprising a lanyard comprising an attachment portion and a retention portion.

10. The apparatus of claim 9, wherein the retention portion is retained by the cap.

11. An apparatus comprising:
a body comprising an interior having a jaw assembly section; and
a jaw assembly disposed in the jaw assembly section of the body, the jaw assembly comprising;
a plurality of jaws each having an exterior side and an interior side wherein each of the plurality of jaws has a spring groove on the exterior side, and
a grip ring having a plurality of grip ring legs wherein ones of the plurality of grip ring legs respectively engage the spring groove on each of the plurality of jaws.

12. The apparatus of claim 11, wherein the grip ring comprises a grip ring opening wherein a plurality of gripping teeth extend from the grip ring into the grip ring opening.

13. The apparatus of claim 11, wherein a one of the plurality of jaws comprises a retaining ear that retains the grip ring.

14. The apparatus of claim 11, wherein a one of the plurality of grip ring legs comprises a grip ring leg first element that engages a spring groove first opening on the spring groove that the one of the plurality of grip ring legs engages.

15. The apparatus of claim 11, wherein a one of the plurality of grip ring legs comprises a grip ring leg second element that engages a spring groove second opening on the spring groove that the one of the plurality of grip ring legs engages.

16. The apparatus of claim 11, wherein each of the plurality of jaws comprise jaw teeth on their respective interior side.

17. An apparatus comprising:
a cap;
a body attached to the cap, the body comprising an interior having,
a sleeve section, and
a jaw assembly section;
a sleeve disposed in the sleeve section of the body; and
a jaw assembly disposed in the jaw assembly section of the body,
the jaw assembly comprising a plurality of jaws each having an exterior side and an interior side wherein a one of the plurality of jaws comprises an alignment feature on the exterior side that engages an alignment groove in the jaw assembly section of the body.

18. The apparatus of claim 17, wherein the one of the plurality of jaws comprises a jaw taper on the exterior side that engages a body taper in the jaw assembly section of the body.

19. The apparatus of claim 17, wherein:
each of the plurality of jaws has a spring groove on the exterior side; and
further comprising a grip ring having a plurality of grip ring legs wherein ones of the plurality of grip ring legs respectively engage the spring groove on each of the plurality of jaws.

20. The apparatus of claim 19, wherein the one of the plurality of jaws comprises a retaining ear that retains the grip ring.

21. An apparatus comprising:
a cap having an extension sleeve portion;
a body attached to the cap, the body comprising an interior having,
a sleeve section in which the extension sleeve portion of the cap is disposed, and
a jaw assembly section; and
a jaw assembly disposed in the jaw assembly section of the body, the jaw assembly comprising;
a plurality of jaws each having an exterior side and an interior side wherein each of the plurality of jaws has a spring groove on the exterior side, and
a grip ring having a plurality of grip ring legs wherein ones of the plurality of grip ring legs respectively engage the spring groove on each of the plurality of jaws.

22. The apparatus of claim 21, wherein the grip ring comprises a grip ring opening wherein a plurality of gripping teeth extend from the grip ring into the grip ring opening.

23. The apparatus of claim 21, wherein a one of the plurality of jaws comprises an alignment feature on the exterior side that engages an alignment groove in the jaw assembly section of the body.

24. The apparatus of claim 21, wherein a one of the plurality of jaws comprises a jaw taper on the exterior side that engages a body taper in the jaw assembly section of the body.

25. The apparatus of claim 21, wherein a one of the plurality of jaws comprises a retaining ear that retains the grip ring.

26. The apparatus of claim 21, wherein a one of the plurality of grip ring legs comprises a grip ring leg first element that engages a spring groove first opening on the spring groove that the one of the plurality of grip ring legs engages.

27. The apparatus of claim 21, wherein a one of the plurality of grip ring legs comprises a grip ring leg second element that engages a spring groove second opening on the spring groove that the one of the plurality of grip ring legs engages.

28. An apparatus comprising:
   a cap having an extension sleeve portion;
   a body attached to the cap, the body comprising an interior having,
      a sleeve section in which the extension sleeve portion of the cap is disposed, and
      a jaw assembly section; and
   a jaw assembly disposed in the jaw assembly section of the body, the jaw assembly comprising a plurality of jaws each having an exterior side and an interior side wherein a one of the plurality of jaws comprises an alignment feature on the exterior side that engages an alignment groove in the jaw assembly section of the body.

29. The apparatus of claim 28, wherein the one of the plurality of jaws comprises a jaw taper on the exterior side that engages a body taper in the jaw assembly section of the body.

30. The apparatus of claim 28, wherein:
   each of the plurality of jaws has a spring groove on the exterior side; and
   further comprising a grip ring having a plurality of grip ring legs wherein ones of the plurality of grip ring legs respectively engage the spring groove on each of the plurality of jaws.

31. The apparatus of claim 30, wherein the one of the plurality of jaws comprises a retaining ear that retains the grip ring.

* * * * *